United States Patent
Piccat

(10) Patent No.: US 7,874,376 B2
(45) Date of Patent: Jan. 25, 2011

(54) FLUTED FARMING DISC

(75) Inventor: Julio Cesar Piccat, Monte Maiz (AR)

(73) Assignee: Ingersoll Argentina S.A., Provincia de Cordoba (AR)

(*) Notice: Subject to any disclaimer, the term of this patent is extended or adjusted under 35 U.S.C. 154(b) by 20 days.

(21) Appl. No.: 12/503,186

(22) Filed: Jul. 15, 2009

(65) Prior Publication Data

US 2010/0147541 A1    Jun. 17, 2010

(30) Foreign Application Priority Data

Dec. 17, 2008    (AR) ............................... P080105473

(51) Int. Cl.
*A01B 15/16*    (2006.01)
(52) U.S. Cl. ....................................... 172/604
(58) Field of Classification Search ............... 172/604, 172/765
See application file for complete search history.

(56) References Cited

U.S. PATENT DOCUMENTS

| | | | | |
|---|---|---|---|---|
| 323,343 A * | 7/1885 | La Dow | ........................ | 172/566 |
| 323,344 A * | 7/1885 | La Dow | ........................ | 172/579 |
| 395,638 A * | 1/1889 | Stuart | .......................... | 172/153 |
| 809,888 A * | 1/1906 | Avery | ......................... | 301/41.1 |
| 2,908,338 A * | 10/1959 | Hanrahan | ................... | 172/555 |
| 3,559,748 A * | 2/1971 | Shelton | ........................ | 172/604 |
| 3,752,238 A * | 8/1973 | Chilton | ......................... | 172/180 |
| 5,649,602 A * | 7/1997 | Bruce | .......................... | 172/604 |
| 7,143,838 B2 * | 12/2006 | Piccat | .......................... | 172/604 |
| 7,497,270 B2 * | 3/2009 | Bruce | ........................... | 172/604 |
| 2002/0038620 A1 * | 4/2002 | Gentilhomme | .............. | 111/166 |

* cited by examiner

*Primary Examiner*—Thomas B Will
*Assistant Examiner*—Joel F Mitchell
(74) *Attorney, Agent, or Firm*—Porzio, Bromberg & Newman, P.C.

(57) ABSTRACT

A fluted farming disc comprising a plate having a peripheral cutting edge and a central portion, and a plurality of waves extending radially inwardly from the cutting edge and forming a plurality of crests and a plurality of valleys, with the plurality of crests extending radially beyond the plurality of valleys in a manner to define a radially toothed cutting edge.

3 Claims, 3 Drawing Sheets

FLUTED FARMING DISC

BACKGROUND OF THE INVENTION

1. Field of the Invention

The present invention relates to the field of devices, appliances and assemblies employed in activities concerning agricultural production and farming, and more particularly, the invention concerns a rotating disc that is preferably employed as a harrow disc or farming disc for an agricultural machine.

2. Description of the Prior Art

Many agricultural tools are well known in the art, some of them disc or coulter type tools to work the soil. To obtain a better understanding of the object and the reach of the present invention it is convenient to describe the current state of the art concerning clearing and farming discs and coulters, used to work, such as cut and penetrate, the terrain.

In that sense, the existence of a variety of forms, diameters and materials that shape and give different functional characteristics to said clearing discs, is of common knowledge among those who are familiar with the art. Therefore it is understandable that said shapes, diameters and materials are generally adjusted to a greater or lesser extent to the expected conditions of the terrain that said discs will be working on.

However, as the main objective of a clearing, farming or furrow disc is to efficiently cut and penetrate the terrain, its leading edge will have to be sufficiently aggressive and penetrate the terrain to ensure it breaks up the earth efficiently.

For that purpose, the discs are often provided with a perimeter edge M and even a plurality of symmetrical grooves or slots that are distributed uniformly as illustrated on the disc ($D_1$) in FIG. 1 corresponding to the above.

This particular shape includes grooves or slots applied to its periphery to serve as a perforation tool, in order to increase the cutting aggressiveness against the terrain, which contributes to the breaking up of the earth and the penetration of said terrain. Nonetheless, practice has shown that continuous labor and terrain aggressiveness against the border or edge provokes a progressive wearing of the disc perimeter, and the symmetrically grooved profile gradually loses its effectiveness when penetrating, removing and cutting the terrain, as it is better illustrated in the worn disc ($D_2$) of FIG. 1.

Many other attempts have also considered the incorporation of an undulated or wavy surface of the material the disc is made of, thus trying to use said undulation or waves to contribute to the aggressive action of the disc on the terrain. Although this has been an improvement over the prior tools, the continuous labor against the terrain eventually degrades the original profile and consequently alters the performance of the new disc. For this reason, and having detected these inconveniences, it would be necessary to create a terrain farming, sowing and/or cutting disc, with particularly beneficial characteristics that allow for a minimization of the losses or variations in performance during its wear as a result of usage. Therefore it is necessary to have a periphery or leading edge that is generally conserved even after prolonged use and wear.

SUMMARY OF THE INVENTION

It is therefore an object of the invention to provide a fluted farming disc that facilitates the penetration and breaking up of the terrain, in such a way that the decline or modification in performance of the disc is not excessively altered by its wear.

It is also an object of the invention to provide a fluted farming disc with a simple manufacturing process, using conformation processes that are applied industrially in the art, and without resorting to the use of accessory parts or elements that are welded, screwed, connected or that require accessory assembly to said disc.

It is another object of the invention to provide a fluted farming disc that can be assembled to replace conventional discs, without requiring special adaptations or knowledge from the user, in machines that are currently in use.

It is yet another object of the invention to provide a fluted farming disc of the type that presents a central, disc-shaped section that includes a central rotation opening, where said revolving disc is generally made from a resistant laminar material such as sheet metal, where said disc presents a plurality of superficial crests and superficial valleys alternately distributed on the peripheral circular crown of said disc, generating at least a partial undulation of its surface, where said superficial crests protrude towards the convex side of said circular crown of said disc and said superficial valleys are oriented towards the concave side of said circular crown of said disc, as this surface undulation is combined with an asymmetrical toothed perimeter edge that comprises a plurality of asymmetrical perimeter crests and asymmetrical perimeter valleys with sawtooth form, while this combination of surface undulation and perimeter ridge allow the disc to generally maintain its characteristic performance even after usage wear.

It is yet another object of the invention to provide a fluted farming disc comprising a plate having a peripheral cutting edge and a central section, and a plurality of waves in the plate with the waves extending radially inwardly from the cutting edge and forming a plurality of crests and a plurality of valleys, and wherein one of the plurality of crests and the plurality of valleys extends radially beyond the other plurality of crests and the plurality of valleys, whereby the peripheral cutting edge defines a radially toothed cutting edge.

The above and other objects, features and advantages of this invention will be better understood when it is considered in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENT

Figure 1:
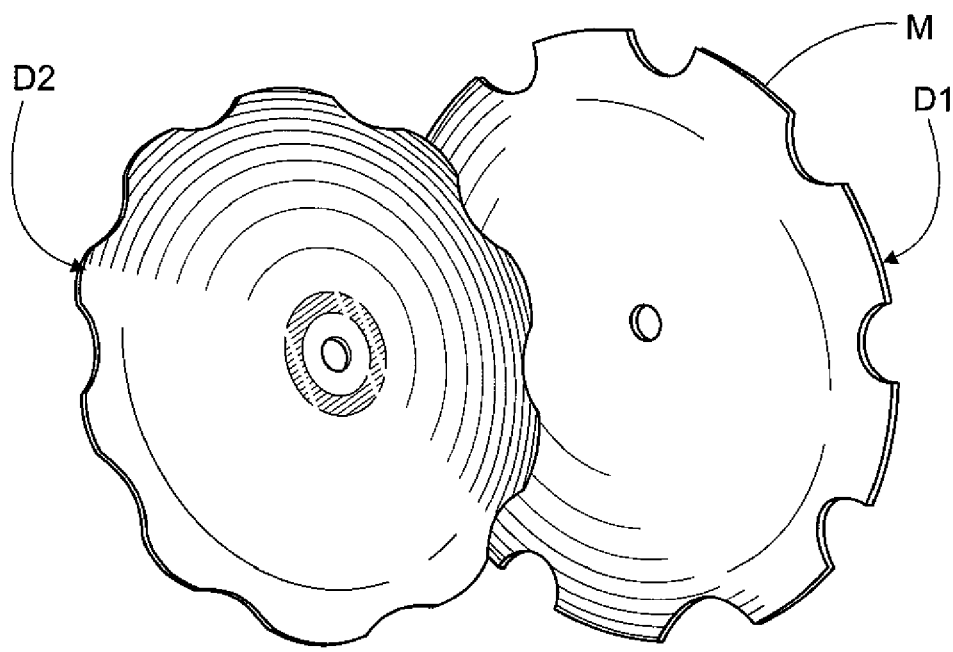
FIG. 1 is the illustration of an unused harrow disc ($D_1$) in the background and a worn harrow disc ($D_2$) in the foreground in agreement with the prior art, where the deterioration can be observed of the faded "M" grooves or slots on the periphery of the worn disc ($D_2$)
Figure 2:
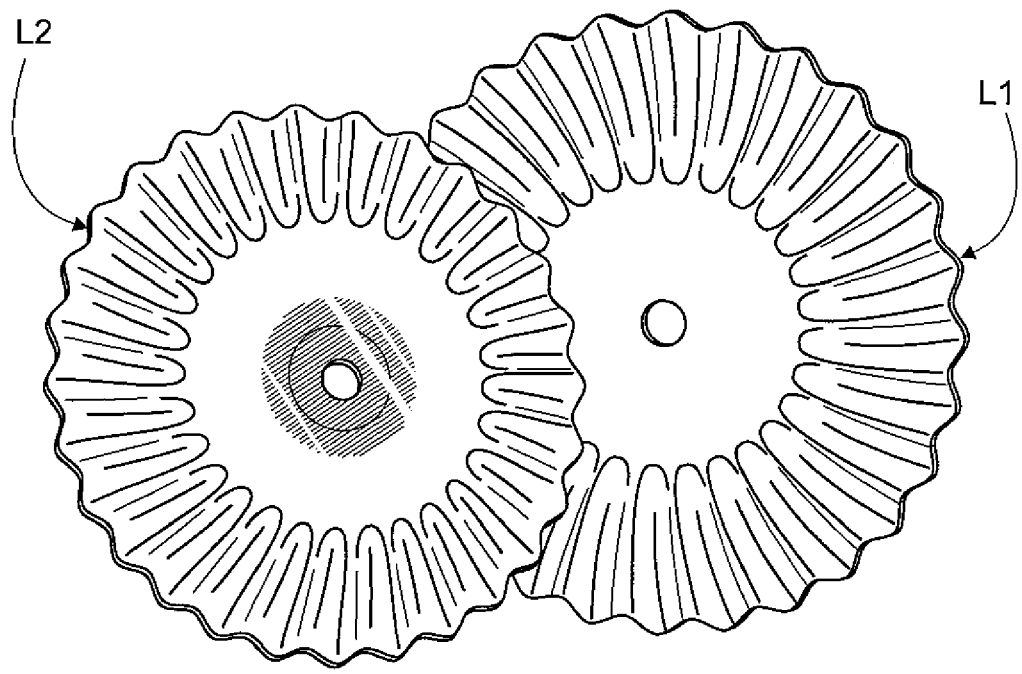
FIG. 2 shows an unused farming disc ($L_1$) in the background, made in agreement with the current invention, and in the foreground the same type of disc ($L_2$) after usage, which has suffered the abrasive wear of the terrain, nonetheless an advantageous conservation of the toothed profile of the cutting edge is observed.

Now referring in detail to the invention, the same refers to a fluted or wavy farming disc or coulter ($L_1$) or simply referred to as disc (1) presents a normal disc form made of circular sheet which is generally bulged or curved, that is to say, has a generally concave side as shown in FIG. 2.

Figure 3:
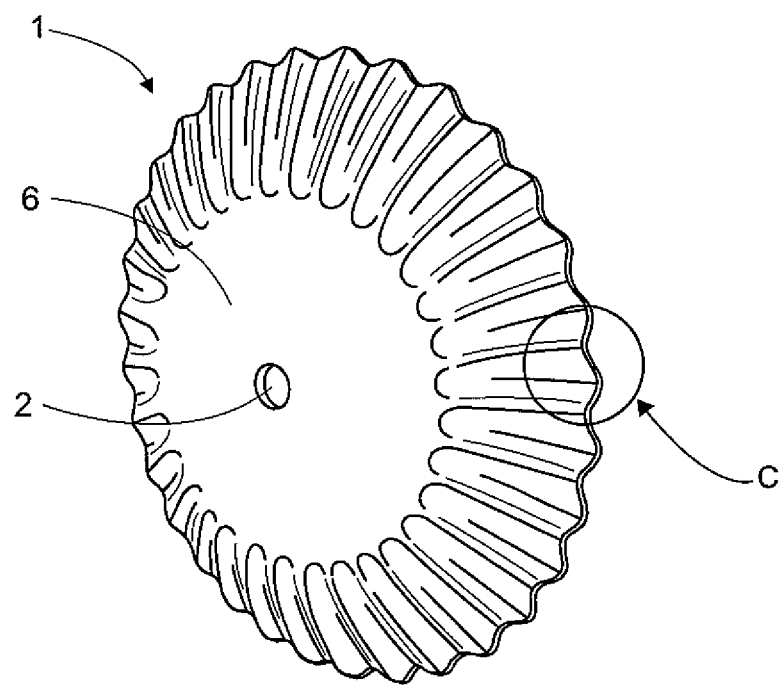
FIG. 3 is a perspective view of the farming disc according to the present invention, seen from the convex side.
Figure 4:
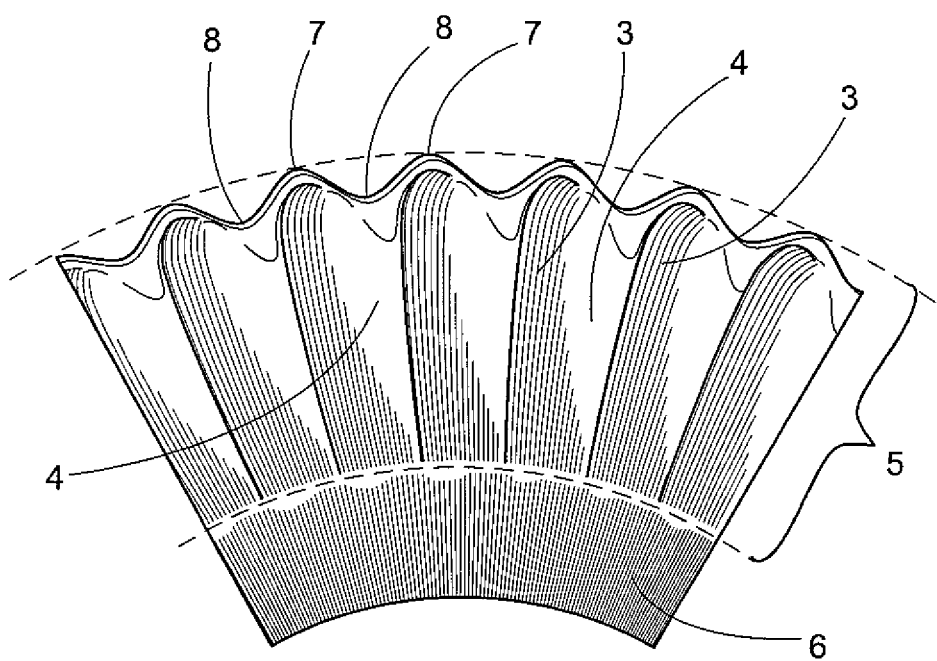
FIG. 4 is a detailed plan view of one portion of the farming disc's edge that is the subject of this invention, taken from above, that is to say viewed from the convex side or back of the farming disc, and for reference sake, a phantom line has been used to indicate the perceivable visual separation between the circular crown that includes superficial crests and valleys, and the disc-shaped center that supports the disc.
Figure 5:
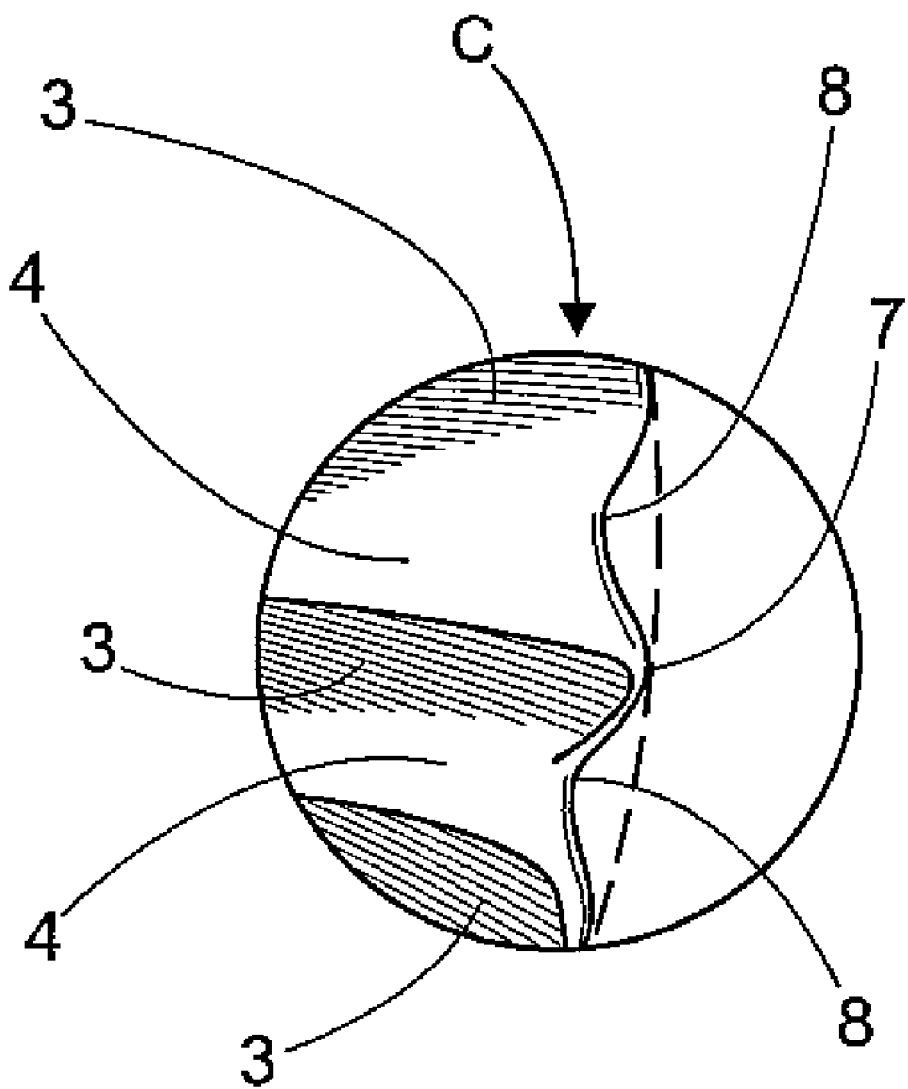
FIG. 5 is a view of the peripheral edge of the disc enclosed into detail disc C of FIG. 3.

As the disc (1) is constructed using a disc or plate such as a resistant metal sheet, it usually has a constant thickness with a convex back, as can be seen in FIGS. 3 to 5.

It is common knowledge in the art that this type of totally or partially bulged or curved discs can be obtained from a resistant laminar object such as a metal sheet through any mechanical conformation or pressing process, as is generally applied for this type of curving processes, or in any other way that is convenient or equivalent and known in the art.

Furthermore, the purpose of said disc (1) is to rotate as a cutting and breaking blade, and for this reason it is assembled on a central shaft that, for practical reasons, is connected to the central opening (2), which is usually circular.

Said central opening (2) is located on a central disc-shaped section (6) of said disc (1), allowing said central disc-shaped section (6) to be flat, or concave/convex in respect of a circular crown or annular region (5) indicated for reference sake in FIG. 4, and with an approximate division or separation using a phantom line. Therefore, the shape of said central disc-shaped section (6) is included in the curvature range of the surface that can vary from a flat form or surface to a concave form or surface, where said concave surface is preferably equally or less concave than said circular crown (5), this way a bigger support surface is provided for the mounting or retention blocks of disc (1), avoiding that the disc cannot perform its job correctly as a result of slipping vis-à-vis the block.

The innovative farming disc (1) includes a plurality of superficial crests (3) and superficial valleys (4), distributed over said peripheral section or circular crown (5). Consequently, said area or circular crown (5) is generally determined by the presence of said plurality of superficial crests (3) and superficial valleys (4), which are alternated and which preferably present a generally enlarged shape directed towards the periphery or cutting edge of the disc (1).

Nonetheless, said superficial crests (3) and superficial valleys (4) that determine a superficial undulation or waves of the disc (1) can also adopt other arrangements that have not been illustrated for clarity's sake, such as forwards or backwards inclined or sloped vis-à-vis the radial directives and/or any other equivalent way of development of the current invention.

To contribute to the identification of the characteristic parts of the disc (1) and in order to better reference said superficial crests (3) and superficial valleys (4), they are defined and as a result it is understood that said superficial crests (3) are those parts of the undulated surface that are convex, protrude or are curved in the direction of the convex side of the disc. Furthermore, the superficial valleys (4) are defined as those sections, low relief or sinking of the undulated surface that are concave in relation to the same convex side of the disc (1) and in contraposition to the superficial crests (3), so a circular crown (5) is formed in the form of an undulated or wavy surface with concavities and convexities formed in this manner, as illustrated in FIGS. 2 to 5.

However, the plurality of superficial crests (3) and valleys (4) are not presented by themselves as in conventional discs but on the contrary they are correlated to the toothing of the disc's (1) perimeter edge, it even has a particular combinatory relation with the superficial crests and the superficial valleys as described below.

Said toothed perimeter edge therefore makes up the cutting edge of the disc (1) which will act on the terrain. Preferably, the perimeter edge is sharpened by appropriate beveling or chamfering, as if it were a sharp knife edge, said bevel or sharp edge will accompany the development of said toothed perimeter edge.

For the purpose of this invention, said toothed perimeter edge has a plurality of asymmetrical perimeter crests (7), that protrude via maxima or peaks towards the periphery of disc (1) and a plurality of asymmetrical perimeter valleys (8) with minima oriented towards the center portion of disc (1), alternated with said perimeter crests (7). According to the invention, crests (7) and valleys (8) may combine with crests (3) and valleys (4) in any convenient manner. For example, crests (7) may coincide with crests (3) and valleys (8) may coincide with valleys (4), or vice versa.

Consequently, the cutting edge of the disc (1) is presented as an asymmetrically toothed perimeter edge as it has a normally shaped perimeter edge with sawtooth form that is smoothened at the maximum of the asymmetrical perimeter crests (7) and at the minimum of the asymmetrical perimeter valleys (8), as illustrated in the attached FIGS. 2 to 4. Indeed, in said attached Figures, the asymmetrical perimeter crests (7) and the asymmetrical perimeter valleys are alternated in sawtooth form. It is worth noting that for the purpose of the current invention, when a sawtooth profile is referred to, this means that the disc (1) edge contains a plurality of teeth, with a more pronounced and short cutting edge, and a cutting edge that is less inclined and long, not necessarily straight, but as smooth as required while maintaining said toothed profile.

In other words, the disc is provided with a plurality of waves, with the waves extending radially inwardly from the cutting edge and forming a plurality of superficial crests (3) and a plurality of superficial valleys (4), and wherein one of the plurality of crests (3) and the plurality of valleys (4) extends radially beyond the other plurality of crests and plurality of valleys, whereby the peripheral cutting edge defines a toothed cutting edge. Thus, the toothed cutting edge is preferably a wavy edge with edge crests (7) and edge valleys (8) defined in a flat or plan view of the disc, as clearly shown in FIG. 4 and, most preferably, the wavy edge defines a sinusoidal type edge with the edge ridge circumferentially aligned as shown by the circular phantom line in FIG. 4.

Preferably, the disc has a convex side and a concave side and said plurality of crests and said plurality of valleys are defined on both said sides, with the crests on one side defining the valleys on the opposite side. In a preferred embodiment crests (7) extending radially beyond valleys (8) are the crests on said convex side, as shown more clearly in FIGS. 3, 4 and 5.

This particular structure of the disc (1) has shown surprising results during penetration and breaking up of the terrain, not only during the first hours of usage but maintaining its performance during long working days and under continuous wear of the edge and diameter over time. In this sense, in FIG. 2 a comparison can be observed between a still unused farming disc ($L_1$), that appears behind a considerably worn farming disc ($L_2$), while both discs respond to the innovative characteristics of the current invention.

As a result an advantageous effect is obtained, thanks to the combining of superficial crests and valleys (3) and (4) in combination with the asymmetrical perimeter crests and valleys (7) and (8), forming an asymmetrical toothed edge between both with a normal sawtooth profile in agreement with what was explained above. This special configuration on a disc (1), allows for the general preservation of the asymmetrically toothed cutting edge with sawtooth form, wherein disc (1) wear takes place in a particular way and the perimeter or cutting edge is preserved using asymmetrical perimeter crests and valleys (7) and (8). This way it is possible to obtain a disc (1) with relatively low concavity compared to conventional discs, as thanks to the concavity of undulated surface of superficial crests and valleys the same degree of removal is obtained as for greater concavities on conventional discs in the previous art. This particular shape of the toothed perimeter edge allows for improved penetrating and breaking qualities, as well as to enhance the performance of the cutting edge or bevel, also contributing to the improvement of the rotating action of the disc (1). In addition, the work performance of the disc in this invention is not shaken significantly even when the disc gets worn and its apparent exterior diameter is reduced. That is, the toothed profile of the cutting edge is conserved, as shown in the plan view of FIG. 4, even after a large use and wearing of the disc. The cutting edge profile is not smoothed as in the prior art.

Therefore, it is obvious to a technician in the matter that a variety of equivalent embodiments, in agreement with what has been revealed and illustrated in the current invention, can be applied in practice, such as simple variations in materials, proportions and shapes of the crests and valleys, as these can then be formed using different techniques such as pressing.

The central disc-shaped section (6), that is related to the circular crown (5) can be applied in practice in such a way that the circular crown (5) can be as big as necessary, and that it ends at the edges of the central rotation opening (2) and/or is related in different ways of proportion and distribution between both parts of the disc that are visually distinguishable at first sight.

While preferred embodiments of the present invention have been illustrated and described, it will be obvious to those skilled in the art that various changes and modifications may be made therein without departing from the scope of the invention as defined in the appended claims.

I claim:

1. A fluted farming disc comprising
    a plate having a peripheral cutting edge and a central portion, and
    a plurality of waves in the plate with the waves extending radially inwardly from the cutting edge and forming a plurality of crests and a plurality of valleys, and wherein one of the plurality of crests or the plurality of valleys extend radially beyond the other of the plurality of crests or the plurality of valleys, whereby the peripheral cutting edge is a wavy edge with asymmetrical perimeter edge crests and asymmetrical perimeter edge valleys defined in a plan view of the disc which defines a radially asymmetrical toothed cutting edge.

2. The disc of claim 1, wherein the disc has a convex side and a concave side, with said plurality of crests and said plurality of valleys being defined on both said sides, and wherein one of said plurality of crests and plurality of valleys extending radially beyond the other of the plurality of crests and the plurality of valleys is the plurality of crests defined on said convex side.

3. The disc of claim 1, wherein the wavy edge defines a sinusoidal type edge.

* * * * *